(12) United States Patent
Nakai et al.

(10) Patent No.: US 7,510,753 B2
(45) Date of Patent: Mar. 31, 2009

(54) PHASE-CHANGE OPTICAL RECORDING MEDIA

(75) Inventors: Tsukasa Nakai, Hino (JP); Sumio Ashida, Yokohama (JP); Keiichiro Yusu, Yokohama (JP); Noritake Oomachi, Yokohama (JP); Naomasa Nakamura, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 517 days.

(21) Appl. No.: 11/235,666

(22) Filed: Sep. 27, 2005

(65) Prior Publication Data

US 2006/0146687 A1 Jul. 6, 2006

(30) Foreign Application Priority Data

Oct. 1, 2004 (JP) ............................. 2004-290675

(51) Int. Cl.
*B32B 3/02* (2006.01)

(52) U.S. Cl. .................... 428/64.4; 428/64.5; 428/64.6; 430/270.13

(58) Field of Classification Search ................ 428/64.5, 428/64.6; 430/270.13
See application file for complete search history.

(56) References Cited

U.S. PATENT DOCUMENTS

| | | | |
|---|---|---|---|
| 5,294,523 A | 3/1994 | Nagata et al. | |
| 5,768,221 A | 6/1998 | Kasami et al. | |
| 5,849,458 A | 12/1998 | Pan et al. | |
| 6,146,734 A | 11/2000 | Ohno et al. | |
| 6,296,915 B1 * | 10/2001 | Yusu et al. | ................. 428/64.1 |
| 6,449,239 B1 | 9/2002 | Uno et al. | |
| 6,541,093 B1 | 4/2003 | Jeong | |
| 6,693,873 B2 | 2/2004 | Kondo et al. | |
| 6,703,098 B2 | 3/2004 | Anzai et al. | |
| 6,775,226 B1 | 8/2004 | Miyamoto et al. | |
| 6,881,466 B2 | 4/2005 | Kojima et al. | |
| 7,008,681 B2 | 3/2006 | Kitaura et al. | |
| 7,009,930 B1 | 3/2006 | Uno et al. | |
| 7,214,416 B2 * | 5/2007 | Nakai et al. | ................. 428/64.4 |
| 7,335,459 B2 * | 2/2008 | Ashida et al. | .......... 430/270.13 |
| 2002/0114915 A1 | 8/2002 | Ohno et al. | |
| 2002/0168495 A1 | 11/2002 | Inase et al. | |
| 2003/0174610 A1 | 9/2003 | Miyamoto et al. | |
| 2003/0180473 A1 | 9/2003 | Nishihara et al. | |
| 2004/0001418 A1 | 1/2004 | Shinotsuka et al. | |

(Continued)

FOREIGN PATENT DOCUMENTS

JP 2000-339760 12/0000

(Continued)

OTHER PUBLICATIONS

Chinese Office Action mailed Mar. 30, 2007 in corresponding Chinese Application No. 2005101085489 together with an English translation.

(Continued)

*Primary Examiner*—Elizabeth Mulvaney
(74) *Attorney, Agent, or Firm*—Nixon & Vanderhye PC

(57) ABSTRACT

A Phase-change optical recording media includes a recording film that causes reversible phase-change between a crystalline phase and an amorphous phase on irradiation with light, and an interface film formed in contact with at least one surface of the recording film and containing Hf (hafnium), O (oxygen) and N (nitrogen).

13 Claims, 4 Drawing Sheets

U.S. PATENT DOCUMENTS

| | | |
|---|---|---|
| 2004/0017768 A1 | 1/2004 | Hibino et al. |
| 2004/0023069 A1 | 2/2004 | Kojima et al. |
| 2004/0076908 A1 | 4/2004 | Oomachi et al. |
| 2004/0121261 A1* | 6/2004 | Ashida et al. .......... 430/270.13 |
| 2004/0222479 A1* | 11/2004 | Uno et al. ................... 257/432 |
| 2005/0019695 A1 | 1/2005 | Kojima et al. |
| 2005/0064334 A1 | 3/2005 | Hirotsune et al. |
| 2005/0089799 A1 | 4/2005 | Otaba et al. |
| 2005/0106353 A1 | 5/2005 | Nakai et al. |
| 2006/0146687 A1 | 7/2006 | Nakai et al. |
| 2006/0291370 A1 | 12/2006 | Nakai et al. |
| 2007/0248785 A1* | 10/2007 | Nakai et al. ................. 428/64.4 |

FOREIGN PATENT DOCUMENTS

| | | |
|---|---|---|
| JP | 2-273341 | 3/1991 |
| JP | 03-52137 | 3/1991 |
| JP | 03-125343 | 5/1991 |
| JP | 5-229258 | 9/1993 |
| JP | 58161161 | 9/1993 |
| JP | 06-171234 | 6/1994 |
| JP | 2674837 | 7/1997 |
| JP | 10-116441 | 5/1998 |
| JP | 10-255324 | 9/1998 |
| JP | 10-329422 | 12/1998 |
| JP | 11-213446 | 8/1999 |
| JP | 11-231446 | 8/1999 |
| JP | 11-265521 | 9/1999 |
| JP | 11-296907 | 10/1999 |
| JP | 11-321094 | 11/1999 |
| JP | 11-339314 | 12/1999 |
| JP | 2000-103165 | 4/2000 |
| JP | 2000-222777 | 8/2000 |
| JP | 2000-322770 | 11/2000 |
| JP | 2000-339748 | 12/2000 |
| JP | 2001-014723 | 1/2001 |
| JP | 2001-126308 | 5/2001 |
| JP | 2001-167475 | 6/2001 |
| JP | 2001-232941 | 8/2001 |
| JP | 2002-279693 | 9/2002 |
| JP | 2002-298433 | 10/2002 |
| JP | 2003-67974 | 3/2003 |
| JP | 2003-178487 | 6/2003 |
| JP | 2003-233931 | 8/2003 |
| JP | 2003-303443 | 10/2003 |
| JP | 2003-323743 | 11/2003 |
| WO | 03-025923 | 3/2003 |

OTHER PUBLICATIONS

U. S. Appl. No. 10/972, 768.

U. S. Appl. No. 10/717,963.

Kojima, et al., "Ge-Sn-Sb-Te Phase-change Recording Material Having High Crystallization Speed", Proceedings PCOS2000, Nov. 30-Dec. 1, 2000, pp. 36-41.

Kuiper, et al., "Improved Interface Stability of Phase-Change Recording Media", Applied Physics Letters, vol. 82, No. 9, Mar. 3, 2003, pp. 1383-1385.

Office Action mailed Apr. 8, 2008 in Japanese Patent Application No. 2004-290675 with English translation.

Rie Kojima et al.; "Ge-Sn-Sb-Te Phase-change Recording Material Having High Crystallization Speed"; Proceedings of the 12$^{th}$ Phase-Change Recording Workshop Symposium (PCOS2000). Nov. 30-Dec. 1, 2000, pp. 36-41.

S. Ogawa et al.; "Optical and Electrical Properties and Electronic Structure of $Ge_2Sb_2Te_5$", Proceedings of the 9$^{th}$ Phase-Change Recording Workshop Symposium (PCOS 1997), 1997, pp. 50-53.

S.K. Bahl et al.; "Amorphous Versus Crystalline GeTe Films, III Eletrical Properties and Band Structure", Journal of Applied Physics, vol. 41, No. 5, Apr. 1970, pp. 2196-2212.

T. Inase et al; "Investigation of Protective Layer for High Transfer Rate Phase Change Optical Disk," Tojyo Research Lab., Tosoh Corp., pp. 37-42 (proceedings of the 13$^{th}$ Symposium of Phase Change Optical Information Storage Digest (Dec. 6, 2001)).

Mayumi Uno et al., "Acceleration of crystallization process by nitride interface layer," Optical Disk Systems Development Center, Matsushita Electric Industrial Co., Ltd., pp. 85-90 (Proceedings of the 10$^{th}$ Symposium on Phase Change Optical Information Storage (Nov. 1998)).

Michiaki Shinotsuka et al., "High-speed Blue-laser Recording of the Double-decker Phase Change Disk with high-Reliability," Research and Development Group, Ricoh Company, Ltd., IEEE 2002, pp. 234-236 (Jul. 7, 2002).

Toshio Inase et al., "Development of a New Protective Layer for Rewritable Digital Versatile Disks," TSOH Research & Technology Review, vol. 46, 2002, pp. 17-23.

* cited by examiner

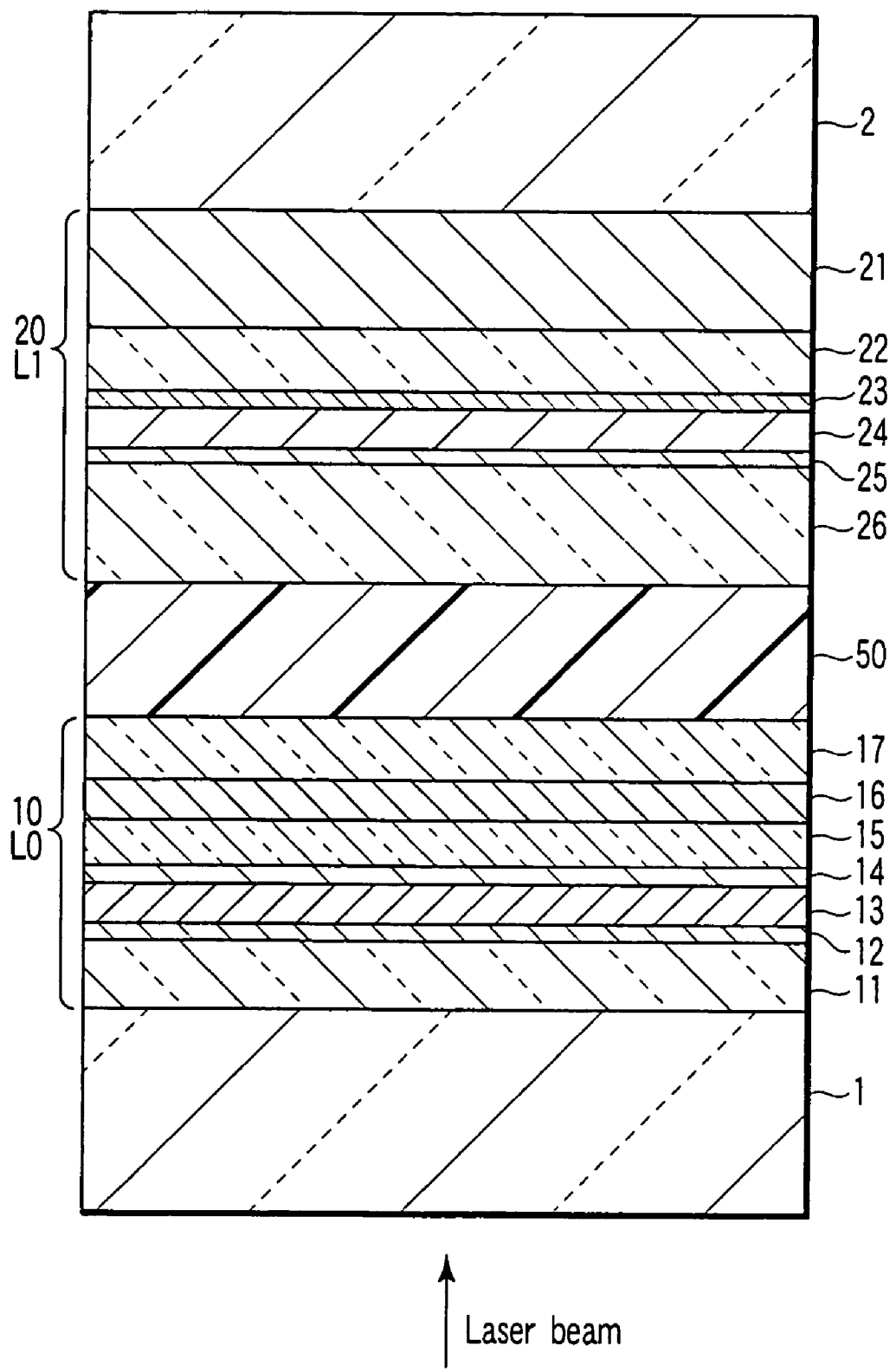
F I G. 1

PHASE-CHANGE OPTICAL RECORDING MEDIA

CROSS-REFERENCE TO RELATED APPLICATIONS

This application is based upon and claims the benefit of priority from prior Japanese Patent Application No. 2004-290675, filed Oct. 1, 2004, the entire contents of which are incorporated herein by reference.

BACKGROUND OF THE INVENTION

1. Field of the Invention

The present invention relates to a phase-change optical recording media in which reversible change of atomic arrangement in a recording film between crystalline and amorphous phases is brought about by irradiating the recording film with a light beam so as to record information.

2. Description of the Related Art (Principle of Phase-Change Optical Recording Media)

A phase-change optical recording media, which uses a phase-change optical recording film that causes a reversible phase-change between crystalline and amorphous phases on irradiation with a light beam, operates according to the following principle. A write operation is performed by heating the region irradiated with a light beam to temperatures higher than the melting point of the film to melt that region, followed by rapidly cooling to make atomic arrangement in that region amorphous. An erase operation is performed by retaining for at least a prescribed time the region irradiated with the light beam within a temperature range from the crystallization temperature or more to the melting point or less. In this operation, if the region is crystalline in the initial state, it remains crystalline, and if the region is amorphous in the initial state, it is crystallized (solid-phase erasing mode). Depending on a material for the recording film, a method of heating the vicinity of an amorphous region in the recording film to the melting point or more to melt that region and then slowly cooling and crystallizing that region (melt erasing mode) may be adopted. A read operation (reproducing) is performed by converting the intensity of a reflected beam into the intensity of an electric signal utilizing the phenomenon that the intensity of a beam reflected from an amorphous region is different from that of a beam reflected from a crystalline region, followed by subjecting the electric signal to analog-to-digital (A/D) conversion.

It should noted that write and read operations can be performed by utilizing a transition between a metastable crystalline phase and a stable crystalline phase as in martensite or a transition between metastable crystalline phases as well as the phase-change between the crystalline and amorphous phases noted above.

(Methods for Increasing Density)

Two methods described below may be used to increase the amount of information that can be recorded in a single recording media, i.e., the recording capacity.

One of the methods is to reduce the pitch of recording marks in the track direction. However, when the pitch of recording marks is significantly reduced, it reaches a level that is smaller than the size of a read beam. In such a case, two recording marks may be temporarily included in a read beam spot. If the recording marks are sufficiently separated from each other, a read signal is significantly modulated to have high amplitude. However, if the recording marks are close to each other, the signal has low amplitude, with the result that an error is easily generated in converting the signal into digital data.

The other method is to reduce the track pitch. This method enables to increase the recording density without being significantly subjected to degradation of signal intensity, unlike the case of reducing the mark pitch. However, a problem with this method is that, in such geometry that the track pitch is equal to or smaller than the size of a light beam, a so-called cross-erase may be caused in which the information in a certain track is degraded when a write or erase operation is performed on the adjacent track.

The possible causes of the cross-erase are as follows. First, the recording mark on a certain track is directly irradiated with the outer peripheral portion of a laser beam applied to the adjacent track. Second, heat generated in the write operation to the adjacent track flows into the track in question to raise the temperature of the mark on the particular track and to deform the mark. These problems must be solved in order to increase the density of the phase-change optical recording media. Also, in order to suppress probability of read error for small recording marks to a low level, it is desirable that the recording marks be formed in a manner to have a smooth contour so as to suppress a noise component as much as possible.

(Increase in Capacity by Using a Multi-layer Media)

Another technique for increasing the capacity involves stacking a plurality of information layers each including a phase-change optical recording film (see, for example, Jpn. Pat. Appln. KOKAI Publication No. 2000-322770). The media in which two information layers are stacked so that a read or write operation can be performed on one side of the media is called a single-sided, dual-layer media or simply a dual-layer media. Two single-sided, dual-layer media may further be stacked to obtain double-sided, quadruple-layer media to further increase the capacity. In the single-sided, dual-layer media, a first information layer (referred to as L0 hereinafter) closer to the light incident plane must have a transmittance of at least about 50%. This is because it becomes important to prevent light from being attenuated in the L0 layer more markedly than required, when a second information layer (referred to as L1 hereinafter) which is remote from the light incident plane is accessed. To achieve this, the phase-change optical recording film in the L0 layer must be as very thin as 10 nm or less. Such a thin phase-change optical recording film increases the retention time required for crystallization, resulting in generation of non-erased bits, i.e., decrease in an erase rate, at a normal write speed.

As one of the measures for this problem, it is known to be effective to substitute Sn for a part of a GeSbTe recording film (see Proceedings of the 12th Symposium on Phase-Change Optical Information Storage PCOS 2000, pp. 36-41). Similarly, it is known to be effective to substitute Bi, In, Sn, or Pb for a part of the GeSbTe recording film (see Jpn. Pat. Appln. KOKAI Publication No. 2001-232941). However, such improvement as modification in the composition of the recording film is insufficient to compensate for a reduced crystallization speed accompanied by decrease in the thickness of the recording film. Accordingly, it has been proposed to provide, for example, a germanium nitride (GeN) film which serves as an interface film effective for accelerating crystallization at an interface with the recording film (see Proceedings of the 12th Symposium on Phase-Change Optical Information Storage PCOS 2000, pp. 36-41, mentioned above). However, it has been found from studies made by the present inventors that cross-erase occurs with the combination of a thin recording film of 10 nm or less and a conventional interface film such as GeN, making it impossible to reduce the track pitch effectively. Further, it has been found that the use of silicon carbide (SiC) which has been reported to exhibit a function of accelerating crystallization as an interface film results in a great extinction coefficient at the wavelength of 405 nm for a blue-violet laser (LD) used in next-generation high-density optical disks, leading to a very heavy optical loss. It has also been found that an interface film formed of germanium nitride (GeN) or silicon nitride (SiNx) brings about an optical loss.

On the other hand, a media without the interface film can suppress crystallization of a melted portion to minimize the occurrence of cross-erase. However, such a media has been found to have a very insufficient erase rate. Further, in the L1 layer, a write or erase operation must be performed using a laser beam having an intensity reduced to half as a result of passage through the L0 layer. This requires the sensitivity of the media to be increased. Therefore, it is also important to reduce the optical loss in the interface film or dielectric film in order to increase the availability of a laser beam.

(Method for High-speed Recording)

High-speed recording is another requirement for phase-change optical recording. When a movie is being recorded, for example, if the recording can be completed in a time shorter than the actual viewing time, it is possible to easily accomplish a so-called time shift function that enables an audience to view previous video during dubbing of a distributed media or during broadcast recording. Here, one of factors hindering a high-speed operation in phase-change recording is a problem of an insufficient erase rate. That is, when an erase beam with a relatively low power level is used for crystallization during overwriting, a certain amount of information may remain without being erased. This problem occurs because a recording mark passes through a laser spot at high speed, and thus the recording mark cannot be retained for a sufficient time under a temperature range within which crystallization is enabled, so that a certain amount of information may remain.

As an improvement to facilitate crystallization so as to increase erase speed, it has been disclosed to provide an interface film formed of a material such as GeN in contact with the recording film (see Jpn. Pat. Appln. KOKAI Publication No. 11-213446). However, when making experiments using the material disclosed in this document as an interface film, the inventors found that a melted portion is partly recrystallized during recording, which means that a larger area must be melted in order to produce a recording mark of a required size. Since the use of such an interface film leads melt of an area larger than necessary, the occurrence of cross-erase is facilitated, which produces adverse effects in view of high-density recording. In other words, when recording is performed with a laser power within a range permitted in view of cross-erase, the width of a recording mark formed is reduced, leading to a problem of reduction in carrier-to-noise ratio (CNR). On the other hand, it has been found that a media without any interface film can suppress recrystallization of the melted portion and thus can suppress cross-erase, but provides a very insufficient erase rate. Therefore, a novel interface film which can suppress recrystallization of a melted portion during recording while increasing the crystallization speed in erasing is demanded.

(Film Design for Phase-change Optical Recording Media)

With phase-change optical recording media, as previously described, an amorphous mark which is data is written in a desired portion of the recording film by irradiation with a laser pulse, and data is erased by irradiating the amorphous mark with a laser beam so as to crystallize the mark. In the former operation, the amorphous mark is formed by rapidly cooling the portion irradiated with the laser beam. In the latter operation, the amorphous portion is crystallized by slowly cooling the portion irradiated with the laser beam. Further, if the recording film has a high absorbance, a write or erase operation can be performed at a low laser power. Conversely, if the recording film has a low absorbance, a high laser power is required to perform a write or erase operation. The absorbance of the recording film is determined by the optical characteristics of the media formed of a multilayer film. Furthermore, even with similar absorbance, the media can be a rapid or slow cooling structure or can produce anisotropy of thermal characteristics between the in-plane direction and the sectional direction.

That is, optical and thermal designs are mainly considered for the film design for the phase-change optical recording media. The optical design requires the optical characteristics of each thin film. The thermal design requires thermal characteristics including the melting point, latent heat of melting, and crystallization temperature of each thin film. The optical constants of a thin film can be measured using an ellipsometer. Whereas, several studies have indicated that the thermal characteristics of thin films of the order of nanometers are different from those of a bulk. However, it has been impossible to systematically measure the thermal characteristics of thin films while eliminating the influences of other factors. Thus, empirical parameters have been required to correct measurements of thermal characteristics of thin films. In particular, there have been almost no methods for measuring the interface heat resistance between thin films of the order of nanometers.

(Interface Film Material)

As materials which has a function of accelerating crystallization and can be used as interface films, other than GeN, materials comprising an oxide such as $Ta_2O_5$ into which a carbide or a nitride is mixed have been disclosed (see Jpn. Pat. Appln. KOKAI Publication No. 2003-67974). The oxide such as $Ta_2O_5$ is intended to be used as sulfur-free protective film material. These materials have been examined in order to principally improve current DVDs using a laser with a wavelength λ of 650 nm. However, these materials are opaque at a wavelength λ of 405 nm for next-generation blue-violet LDs, and incur a heavy optical loss. Thus, the materials are inappropriate for use in next-generation high-density media. Further, as described above, GeN, initially proposed as the interface film, is also opaque and incurs a heavy optical loss at the wavelength of next-generation blue-violet LDs. Thus, the currently disclosed techniques do not provide any interface film materials which are optically transparent at the wavelength of blue-violet LDs and which provide a function of accelerating crystallization.

On the other hand, it has been reported that a cap layer such as $AlO_xN_y$, $HfO_xN_y$, $Si_3N_4$ and $In-SnO_x$ used together with a so-called eutectic recording film can effectively improve overwriting (OW) characteristics (A. E. T. Kuiper et al., Applied Physics Letters, Vol. 82 (2003), p. 1383). The arrangement of the cap layer is almost similar to that of the interface film. However, the recording film used in this document is formed of a eutectic material and uses a technique for erasing data by applying a laser beam to a portion where the data has been written thereby melting that portion (so-called melt erase). Accordingly, the cap layer is provided to suppress the diffusion of sulfur (S) in $ZnS-SiO_2$, serving as a protective film, into the recording film. Further, this document discloses only the data on $In-SnO_x$ (so-called ITO), and does not disclose whether other materials can suppress the diffusion of sulfur (S). Furthermore, although the document discloses data indicating that the cap layer improves the OW characteristics, the document discusses the data on the cap layer consisting of SiC and does not disclose any data on the aforementioned materials that would be effectively used as a cap layer. Thus, the document only suggests that the optimum material be selected for the cap layer. Moreover, industrial applications require not only appropriate material and composition of the cap layer but also the detailed description of manufacturing conditions. Therefore, the document does not disclose any completed techniques.

As described above, Sic is known to exhibit a higher absorbance than the GeN or $Ta_2O_5$-based material at the wavelength $\lambda$ of 405 nm for blue-violet LDs used for next-generation optical disks. Thus, if SiC is used as an interface film in an optical disk using a blue-violet LD, it would lower the sensitivity. In addition, if SiC is used as an interface film in the L0 layer of a single-sided dual-layer media, it would lead to decrease in transmittance.

(Material System for Recording Film)

As described above, since the eutectic recording film uses the melt erase mode, the cap layer to the eutectic recording film is not expected to provide the crystallization acceleration function. Thus, the details of the film material and structure thereof have not been examined. Further, since the eutectic recording film uses the melt erase mode, it is very difficult to carry out so-called land/groove recording in which information is written to and read from both land (L) and groove (G). This is very disadvantageous for an increase in recording density.

On the other hand, a so-called pseudo-binary recording film material such as $Ge_2Sb_2Te_5$ can cause phase change from amorphous state to crystalline state at a high-speed in a solid state (solid-phase erase mode), without using the melt erase mode. However, a thin recording film requires a relatively long time for crystallization. Consequently, it is essential to use an interface film having a crystallization acceleration function by which the land/groove recording can be realized.

A data erase process carried out with a eutectic recording film is completely different from that carried out with a recording film of a pseudo-binary system in terms of phenomenon. Thus, the properties required for the cap layer are different from the functions required for the interface film represented by the crystallization acceleration function. Therefore, in order to find a suitable interface film material, it is necessary not only to select an appropriate film material but also to examine the structure and composition of the film material in detail.

BRIEF SUMMARY OF THE INVENTION

A Phase-change optical recording media according to an aspect of the present invention comprises: a recording film that causes reversible phase-change between a crystalline phase and an amorphous phase on irradiation with light; and an interface film formed in contact with at least one surface of the recording film and comprising Hf (hafnium), O (oxygen) and N (nitrogen).

A Phase-change optical recording media according to another aspect of the present invention comprises: a recording film that causes reversible phase-change between a crystalline phase and an amorphous phase on irradiation with light; an interface film formed in contact with at least one surface of the recording film and comprising Hf (hafnium), O (oxygen) and N (nitrogen); a reflective film formed remoter from a light incident side than the recording film or the interface film; and a multilayer film formed between the recording film or interface film and the reflective film and comprising at least three layers of different types of materials with a substantially equivalent refractive index, at least one of the layers comprising Hf (hafnium), O (oxygen) and N (nitrogen).

BRIEF DESCRIPTION OF THE SEVERAL VIEWS OF THE DRAWING

FIG. 1 is a cross-sectional view showing an example of a layer structure of a phase-change optical recording media according to an embodiment of the present invention;

DETAILED DESCRIPTION OF THE INVENTION

Figure 2:
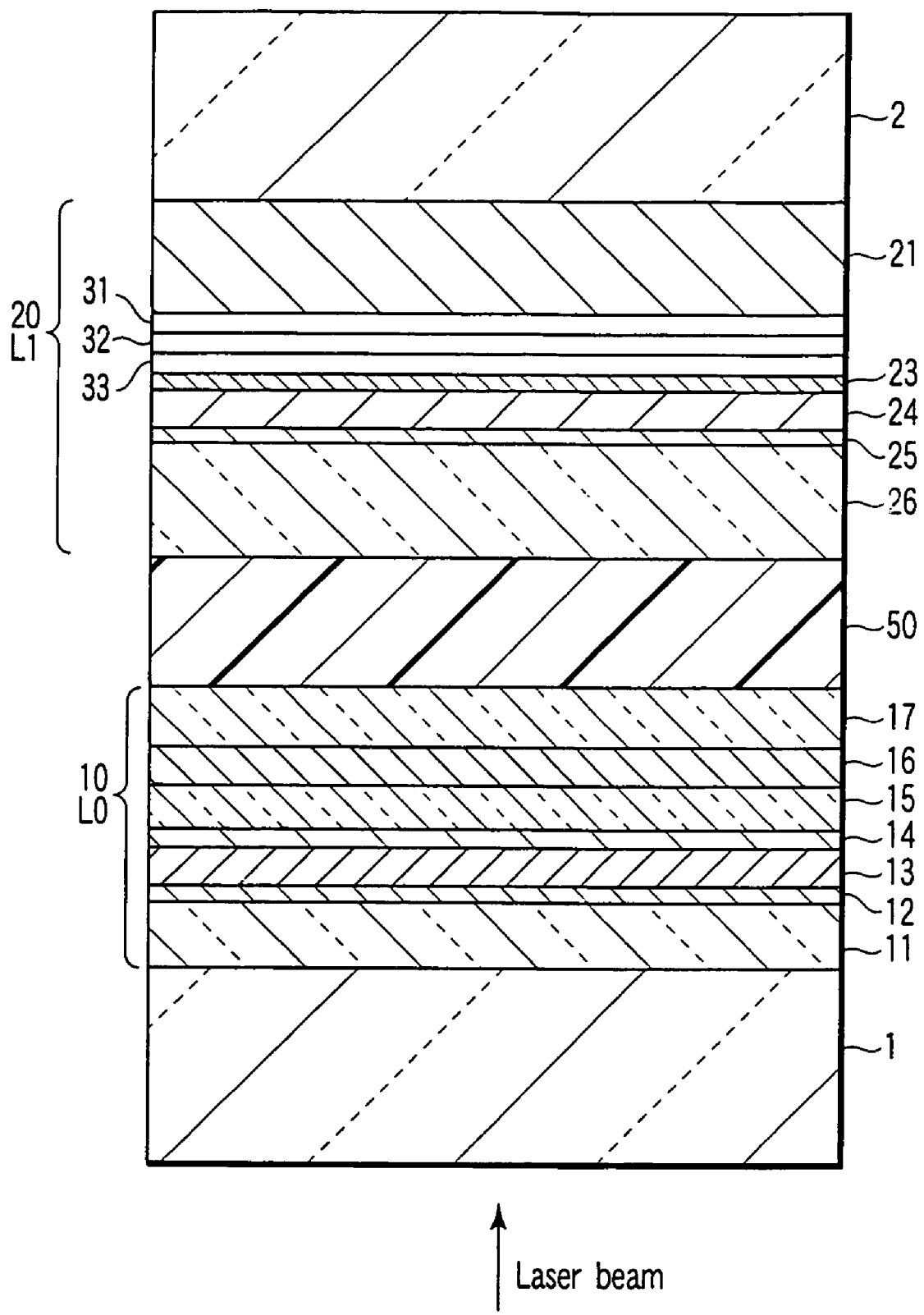
FIG. 2 is a cross-sectional view showing another example of a layer structure of a phase-change optical recording media according to another embodiment of the present invention.

The present invention will be described below in more detail.

A phase-change optical recording media according to an embodiment of the present invention has a recording film that causes reversible phase-change between a crystalline phase and an amorphous phase on irradiation with light, and an interface film formed in contact with at least one surface of the recording film and comprising Hf (hafnium), O (oxygen) and N (nitrogen). The compound forming the interface film corresponds to $HfO_2$ with the O site replaced with N. The interface film preferably has a composition represented by the formula: $HfO_{2-x}N_x$ (where $0<x\leq0.5$), and more preferably has a composition represented by the formula: $HfO_{2-x}N_x$ (where $0.1\leq x\leq0.2$). These formulas are expressed in terms of atomic ratio by setting Hf (hafnium) to 1. The interface film preferably has an optical extinction coefficient of $1\times10^{-2}$ or less.

The compound of Hf, O and N used as the interface film according to embodiments of the present invention is a dielectric material exhibiting good characteristics when used as a so-called protective film, similar to $ZnS$—$SiO_2$. It should be noted that pure $HfO_2$ has a relatively high thermal conductivity and thus slightly lowers media sensitivity when used as a protective film in phase-change optical recording media. The thermal conductivity and optical constant of $HfO_2$ can be adjusted to some degree by controlling the amount of oxygen deficiency. However, it is very difficult to precisely control the amount of oxygen deficiency. In contrast, it is possible to easily adjust the thermal conductivity and optical constant of a thin film formed of a compound of Hf, O and N.

To achieve high-speed recording at, for example, 2× or 4× speed, it is necessary to increase the intensity of a laser beam used. In particular, in a L1 layer in a dual-layer media, a write or erase operation is performed using a laser beam the intensity of which has been reduced almost to half in the L0 layer. Although steady efforts have been made to increase the intensity of a blue-violet laser beam, the L1 layer must have sensitivity almost four times as high as that of the L0 layer. Even a slight decrease in sensitivity may preclude good write and erase operations. Thus, the sensitivity of the media is always desired to be improved.

In the phase-change optical recording media according to an embodiment of the present invention, a multilayer film including at least three layers of different types of materials with a substantially equivalent refractive index may be provided between the recording film or interface film and a reflective film in which at least one layer may be formed of a compound containing Hf (hafnium), O (oxygen) and N (nitrogen). The multilayer is intended to simultaneously achieve optical adjustment and thermal balancing. The inventors call the structure of such a phase-change optical recording media a response enhanced dielectric multilayer (REDML) structure or a thermal response controlled dielectric multilayer (TRC) structure. This structure is also intended to improve sensitivity.

ZnS—SiO$_2$, often used as a material for a protective film in a conventional phase-change optical recording media, is provided between the recording film and the reflective film in order to facilitate cooling of the recording film. A change in the thickness of ZnS—SiO$_2$ of this region is the only means for adjusting the degree of cooling. However, a change in the thickness of ZnS—SiO$_2$ also varies the optical characteristics of the media. The thermal conductivity of ZnS—SiO$_2$ is not substantially changed simply by slightly changing the film structure. On the other hand, substitution of ZnS—SiO$_2$ with another material brings about another problem such as a change in optical characteristics or degradation of the OW characteristics. ZnS—SiO$_2$ has a relatively lower thermal conductivity than other dielectric materials used in the phase-change optical recording media. In order to improve the sensitivity of the media, it is necessary to keep the recording film heated for a certain time and then dissipate heat more promptly in the in-plane direction that the thickness direction.

In contrast, the REDML or TRC structure makes it possible to delay unsteady thermal conduction in a stacked film or lower effective thermal conductivity in a steady state without substantially changing the optical characteristics of the stacked film. Thus, the REDML or TRC structure is very effective for increasing the sensitivity of the media.

Now, a so-called pseudo-binary recording film material such as Ge$_2$Sb$_2$Te$_5$ will be described in more detail. Ge$_2$Sb$_2$Te$_5$ is a representative material in the GeSbTe-based phase-change optical recording materials which have been mainly studied as a recording film for a red or infrared LD since the beginning of the development of the phase-change optical recording media. The reason why Ge$_2$Sb$_2$Te$_5$ is called the pseudo-binary system is that GeSbTe-based ternary alloys in a particular composition range behave as if an alloy of GeTe and Sb$_2$Te$_3$, where GeTe and Sb$_2$Te$_3$ are assumed as a single element, respectively. The composition system is indicated as a line connecting GeTe and Sb$_2$Te$_3$ in a phase diagram of the ternary alloy of Ge, Sb and Te, which is referred to as a pseudo-binary composition.

GeBiTe-based ternary alloys also have a pseudo-binary composition system indicated as a line connecting GeTe and Bi$_2$Te$_3$ in a phase diagram of the ternary alloy of Ge, Bi and Te. It has been found that some GeBiTe-based alloys with the pseudo-binary composition can be suitably used as a recording material for the next-generation phase-change optical recording media.

The recording material with the pseudo-binary composition has an advantage that it is relatively hard to cause segregation, unlike a eutectic recording film. Thus, the recording material with the pseudo-binary composition is very useful for improving the recording density of the phase-change optical media. However, it has been found that even the phase-change optical media using the recording material with the pseudo-binary composition needs an interface film having a crystallization acceleration function in order to provide high-speed and good erase characteristics. Further, in selection of the interface film, it is necessary to investigate the material and its composition and structure as well in detail.

Figure 3:
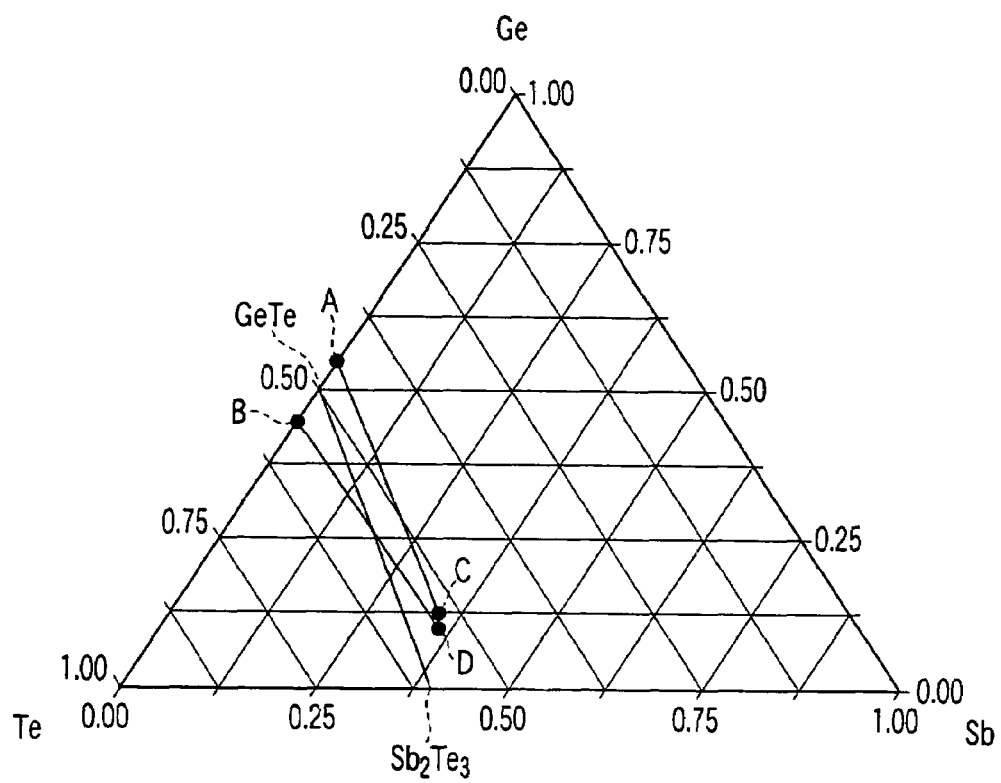
FIG. 3 shows a phase diagram of GeSbTe along with a suitable area of composition.

In the phase-change optical recording media according to embodiments of the present invention, such a recording film may be used that is represented by the following formula: Ge$_x$Sb$_y$Te$_z$, where x+y+z=100, and has a composition within a range defined by x=55, z=45; x=45, z=55; x=10, y=28, z=42; and x=10, y=36, z=54 on a ternary phase diagram of GeSbTe shown in FIG. 3. In the ternary phase diagram of GeSbTe shown in FIG. 3, the composition on the line connecting GeTe and Sb$_2$Te$_3$ corresponds to a so-called pseudo-binary composition. The suitable composition range according to the present invention is defined by the points A, B, C and D (A: x=x=55, z=45; B: x=45, z=55; C: x=10, y=28, z=42; D: x=10, y=36, z=54).

Figure 4:
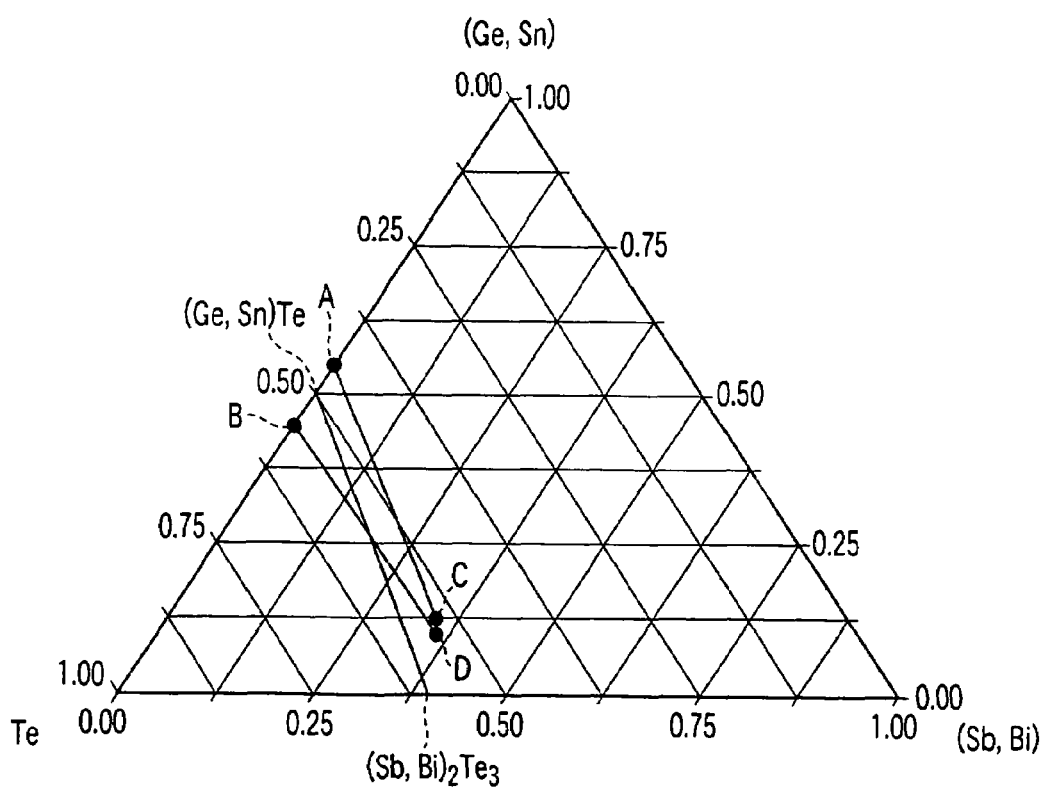
FIG. 4 shows a phase diagram of GeSbTeBi and/or GeSbTeSn along with a suitable area of composition.

The recording film may have a part of constituent elements replaced with Bi and/or Sn and thus have a composition represented by the formula: (Ge$_w$Sb$_{(1-w)}$)$_x$(Sb$_v$Bi$_{(1-v)}$)$_y$Te$_z$, where x+y+z=100, 0≦w<0.5 and 0≦v<0.7 as shown in FIG. 4. In the ternary phase diagram of (Ge, Sn)—(Sb, Bi)—Te shown in FIG. 4, the composition on the line connecting (Ge, Sn)Te and (Sb, Bi)$_2$Te$_3$ corresponds to a so-called pseudo-binary composition. In FIG. 4, the notation (Ge, Sn) indicates that a part of Ge site is replaced with Sn; the notation (Sb, Bi) indicates that a part of Sb site is replaced with Bi. The (Ge, Sn)—(Sb, Bi)—Te system can be considered like the GeSbTe system. The suitable composition range according to the present invention is defined by the points A, B, C and D.

Figure 5:
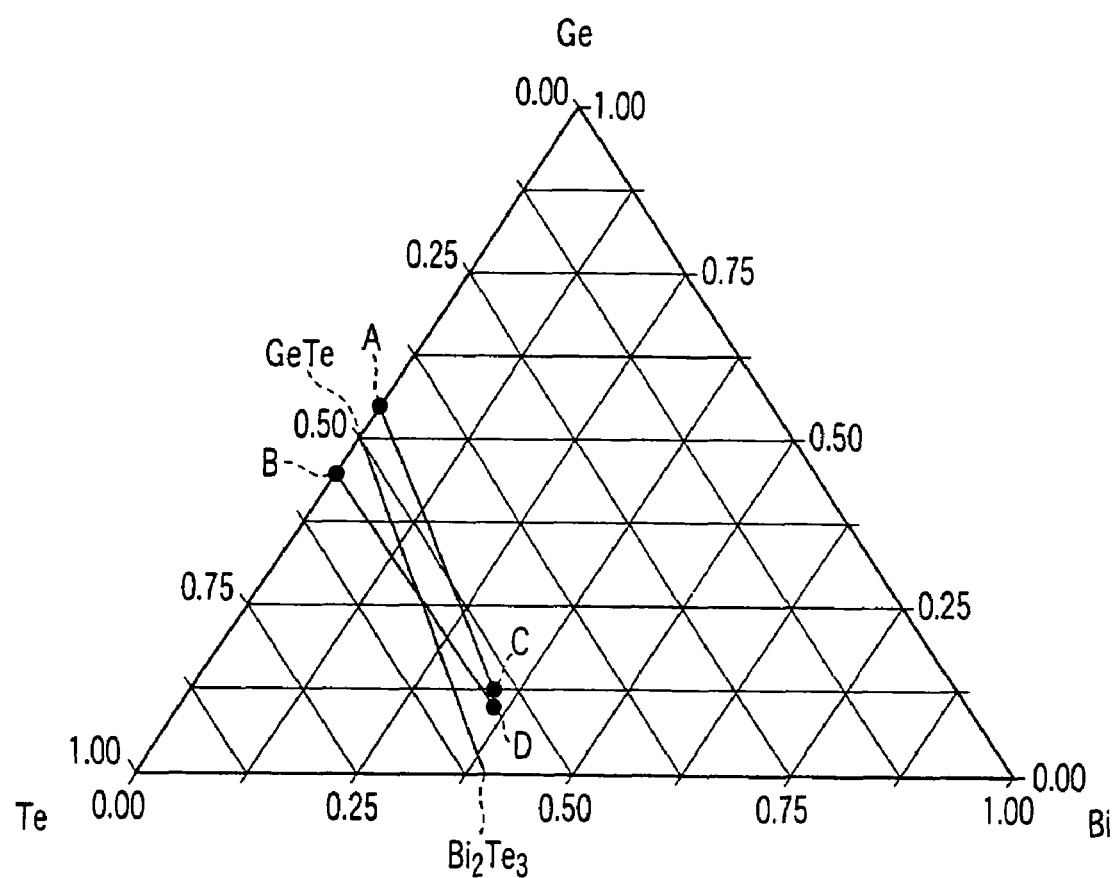
FIG. 5 shows a phase diagram of GeBiTe along with a suitable area of composition.

In the phase-change optical recording media according to embodiments of the present invention, such a recording film may be used that is represented by the formula: Ge$_x$Bi$_y$Te$_z$, where x+y+z=100, and has a composition within a range defined by x=55, z=45; x=45, z=55; x=10, y=28, z=42; and x=10, y=36, z=54 on a ternary phase diagram of GeBiTe as shown in FIG. 5. In the ternary phase diagram of GeBiTe shown in FIG. 5, the composition on the line connecting GeTe and Bi$_2$Te$_3$ corresponds to a so-called pseudo-binary composition. The suitable composition range according to the present invention is defined by the points A, B, C and D.

Although the material and composition of the recording film are selected depending on required crystallization speed, sensitivity of the media, and optical characteristics of the media such as the reflectance, contrast, and transmittance, the above ranges are preferred.

With reference to the drawings, the structure and operation of the phase-change optical recording media according to embodiments of the present invention will be described below.

FIG. 1 shows an example of a film structure of a phase-change optical recording media (single-sided, dual-layer media) according to an embodiment of the present invention. In FIG. 1, a first information layer (L0 layer) 10 closer to a light incident side includes a first interference film 11, a lower interface film 12, a recording film 13, an upper interface film 14, a second interference film 15, a reflective film 16, and a third interference film 17 which are deposited in this order on a transparent substrate 1. A second information layer (L1 layer) 20 remoter from the light incident side includes a reflective film 21, a second interference film 22, an upper interface film 23, a recording film 24, a lower interface film 25, and a first interference film 26 which are deposited in this order on a transparent substrate 2. The L0 layer 10 and the L1 layer 20 are adhered together with an interlayer separation layer 50 consisting of, for example, a UV-curing resin.

The structure of the phase-change optical recording media according to embodiments of the present invention is not limited to the one shown in FIG. 1. For example, another dielectric film may be provided between the second interference film and the reflective film. The interference films located on the both sides of the interface film may be omitted and replaced with the material for the interface film. The reflective film may be omitted. The reflective film may be formed of a plurality of metal films. A dielectric film is further provided on the reflective film.

A media may be used having a structure that various films are deposited on the substrate and a thin transparent sheet with a thickness of about 0.1 mm is bonded to the films to which light is incident on the transparent sheet. It is assumed that an objective lens with a high NA of about 0.85 be used for such a media.

In embodiments of the present embodiment, for the interface film, a compound comprising Hf (hafnium), oxygen (O) and nitrogen (N) with the O site replaced with N is used. The interface film preferably has a composition represented by the formula $HfO_{2-x}N_x$ (where $0<x\leq0.5$), and more preferably has a composition represented by the formula $HfO_{2-x}N_x$ (where $0.1\leq x\leq0.2$). It should be noted that Hf may contain Zr or Ti as an inevitable element because it is difficult to separate these elements during the process of purifying Hf. The effects of the present invention are not failed even with mixing of a very small amount of inevitable element.

In the embodiments of the present invention, significant effects can be produced by using the above interface film with a recording film formed of a material having a composition of a pseudo-binary system represented by the formula $(GeTe)_x(Sb_2Te_3)_y$, and a vicinity thereof, in particular, a material having a Ge composition ratio of 30 at. % or more and 45 at. % or less. Further, more marked effects can be produced by using the above interface film with a recording film having such a composition that Ge in the above formula is partly replaced with Sn and/or Sb in the above formula is partly replaced with Bi. In this case, the substitution ratio of Sn for Ge preferably meets the condition: $Sn/(Ge+Sn)<0.5$; the substitution rate of Bi for Sb preferably meets the condition: $Bi/(Sb+Bi)<0.7$.

In the embodiments of the present invention, significant effects can also be produced by using the above interface film with a recording film formed of a material having a composition of a pseudo-binary system represented by the formula $(GeTe)_x(Bi_2Te_3)_y$, and a vicinity thereof, in particular, a material having a Ge composition ratio of 30 at. % or more and 45 at. % or less.

In the embodiments of the present invention, the recording film preferably has a thickness of 20 nm or less, more preferably 10 nm or less. In particular, the thickness of the recording film in the information layer closer to the light incident side of the single-sided, sided, dual-layer media is preferably set to 10 nm or less. When the above recording film is used, the transmittance and contrast can be significantly improved.

The present inventors made experiments using materials such as germanium nitride (GeN), silicon carbide (SiC), silicon nitride (Si—N) and $Ta_2O_5+SiC$, which are already known as interface film materials effective for accelerating crystallization of the recording film. As a result, they have found that these materials exhibit a trade-off between the crystallization and carrier-to-noise ratio (CNR). That is, a material which greatly facilitates crystallization lowers a CNR, and a material which brings about a high CNR insufficiently facilitates crystallization. Further, all these materials except Si—N have a high optical extinction coefficient at the wavelength $\lambda$ of 405 nm for blue-violet LDs used in next-generation DVDs and thus absorbs a relatively large amount of light, resulting in optical loss. The optical loss may need to increase laser power and hinder improvement of transmittance of the L0 layer, and lower both the sensitivity and contrast of the L1 layer. This brings about various problems to the single-sided, dual-layer media.

In contrast, it has been found that if the interface film formed of a compound containing Hf (hafnium), O (oxygen) and N (nitrogen) according to the embodiments of the present invention is used, the above trade-off becomes insignificant and both a high CNR and a high crystallization facilitation effect can be realized. Moreover, the use the particular interface film for a single-sided, dual-layer media enables both a high transmittance and a high contrast. It has also been found that the use of the interface film material according to the embodiments of the present invention enables both the behavior of accelerating crystallization, i.e., the crystallization speed and the refractive index to be simultaneously controlled by adjusting the composition of the elements in the interface film material.

FIG. 2 shows another example of a film structure of a phase-change optical recording media (single-sided, dual-layer media) according to another embodiment of the present invention. In the media shown in FIG. 2, the L1 layer remoter from the light incident side has a REDML or TRC structure. That is, three-layer film comprising different types of dielectric films 31, 32 and 33 are formed between the upper interface film 23 and reflective film 21 of the L1 layer 20. The structure of the other films is the same as that shown in FIG. 1. In FIG. 2, the intermediate dielectric film 32 of the three-layer film is formed of a compound containing Hf, O and N. The dielectric films 31 and 33 sandwiching the intermediate dielectric film 32 are formed of, for example, $ZnS$—$SiO_2$. FIG. 2 shows the three-layer film, but a multilayer film including more films may be provided between the upper interface film 23 and the reflective film 21.

In the phase-change recording medium having such a structure, not only the interface film can serve to maintain a good crystallization acceleration function, but also the multilayer film can serve to freely vary the effective thermal conductivity while maintaining the effective refractive index to a substantially constant value. This is because the multilayer film in which different types of materials are stacked produces interface heat resistance at the interface between films. Further, when the material for the dielectric films 31 and 33 sandwiching the intermediate dielectric film 32 containing Hf, O and N is $ZnS$—$SiO_2$, for example, the thermal characteristics of the intermediate dielectric film depend only on the material itself provided that external conditions remain unchanged. Thus, it is possible to implement an ultraslow cooling structure, which cannot be achieved using only $ZnS$—$SiO_2$, as well as a function of appropriate cooling in the in-plane direction, which cannot be achieved by combination of conventional materials.

In the phase-change optical recording media, the recording film is heated when the recording film absorbs light, and then the recording film is cooled through transfer of the heat via the films located above and below the recording film. In general, whether the recording film becomes amorphous or crystalline is determined by a balance between the thermal conduction characteristics of the films located above and below the recording film and the crystallization speed of the recording film, in addition to the irradiation power, linear velocity and irradiation time. Accordingly, in order to form good recording marks while providing sufficient erase characteristics at a desired linear velocity, it is important to control appropriately and precisely the thermal conduction characteristics of the films located above and below the recording film.

The interface film material used in the embodiments of the present invention enables both the behavior of accelerating crystallization, i.e., the crystallization speed and the refractive index to be simultaneously controlled and also allows the thermal conduction characteristics to be varied by adjusting the composition of the elements. This significantly makes it easy to design the phase-change optical recording media. Moreover, it is possible to substitute the above interface film material for the $ZnS:SiO_2$ protective film, which has hitherto been considered to be essential. In this case, the number of thin films to be stacked can be reduced, which leads to provide a phase-change optical recording media with high productivity.

Materials used for other films except for the interface film and recording film described above are not particularly limited. Also, for the recording film, it is possible to add a very small amount of element such as Co, V and Ag other than Sn and Si to GeSbTe or to add a very small amount element such as Co, V and Ag to GeBiTe. The expression "formed in contact with the recording film" is applied to the interface film unless a film is intentionally provided between the recording film and the interface film. Accordingly, even if a very thin oxide film (with a thickness of 2 nm or less) naturally formed on the surface of the recording film during deposition is detected by Auger analysis, for example, the interface film is considered to be formed in contact with the recording film.

EXAMPLES

Examples 1 to 7 and Comparative Examples 1 to 6

Table 1 shows materials for the interface film used in the examples and comparative examples as well as the optical property (extinction coefficient) of the materials. The optical property is measured by spectroscopic ellispometry. The transmittance and reflectance of the media are measured with a spectrophotometer. The concentration of each of the elements in thin films is analyzed using techniques such as ICP (induced coupled Plasma), RBS (Rutherford backscattering), SIMS (secondary ion mass spectroscopy), and XPS (X-ray photoelectron spectroscopy). The binding state of the elements in the films is examined by XPS and IR (infrared spectroscopy). The thermal conductivity and thermal diffusivity of a thin film and boundary thermal resistance between stacked thin films are evaluated using a thermoreflectance method.

TABLE 1

| | Interface film | Extinction coefficient |
|---|---|---|
| Example 1 | $HfO_{2-x}N_x$ (x = 0.15) | $3.3 \times 10^{-4}$ |
| Example 2 | $HfO_{2-x}N_x$ (x = 0.04) | 0 |
| Example 3 | $HfO_{2-x}N_x$ (x = 0.08) | 0 |
| Example 4 | $HfO_{2-x}N_x$ (x = 0.1) | 0 |
| Example 5 | $HfO_{2-x}N_x$ (x = 0.2) | $2.1 \times 10^{-3}$ |
| Example 6 | $HfO_{2-x}N_x$ (x = 0.23) | $2.9 \times 10^{-3}$ |
| Example 7 | $HfO_{2-x}N_x$ (x = 0.5) | $1.0 \times 10^{-2}$ |
| Comparative Example 1 | $HfO_2$ | 0 |
| Comparative Example 2 | SiC | 1.81 |
| Comparative Example 3 | none | — |
| Comparative Example 4 | $Ta_2O_5$ + SiC | 0.11 |
| Comparative Example 5 | GeN | 0.15 |
| Comparative Example 6 | GeCrN | 0.19 |

A phase-change optical recording media having a structure shown in FIG. 1 is manufactured. Polycarbonate (PC) substrates with a thickness of about 0.59 mm manufactured by injection molding are used. Each PC substrate has grooves formed at a pitch of 0.68 μm. This corresponds to a track pitch of 0.34 μm in land/groove (L/G) recording. In order to form the L0 layer closer to the light incident side, a $ZnS:SiO_2$ film, an interface film, a recording film, an interface film, a $ZnS:SiO_2$ film, an Ag alloy film, and a $ZnS:SiO_2$ film are deposited in this order on the surface of one PC substrate on which the grooves have been formed using a sputtering apparatus. In order to form the L1 layer remoter from the light incident side, an Ag alloy film, a $ZnS:SiO_2$ film, an interface film, a recording film, an interface film, and a $ZnS:SiO_2$ film are deposited in this order on the other PC substrate using a sputtering apparatus. A mixed target of ZnS and $SiO_2$ is used to deposit the $ZnS:SiO_2$ film.

Materials used for the recording film includes: a material represented by the formula $Ge_xSb_yTe_z$, where x+y+z=100, and having a composition within a range defined by x=55, z=45; x=45, z=55; x=10, y=28, z=42; and x=10, y=36, z=54 on a ternary phase diagram of GeSbTe (see FIG. 3); a material having a composition represented by the formula $(Ge_wSb_{(1-w)})_x(Sb_vBi_{(1-v)})_yTe_z$, where x+y+z=100, $0 \leq w < 0.5$ and $0 \leq v < 0.7$ (see FIG. 4); and a material represented by the formula $Ge_xBi_yTe_z$, where x+y+z=100, and having a composition within a range defined by x=55, z=45; x=45, z=55; x=10, y=28, z=42; and x=10, y=36, z=54 on a ternary phase diagram of GeBiTe (see FIG. 5). Table 2 shows examples of the recording films. The evaluation results described below are for the media using the GeSbTeBi-based recording film.

TABLE 2

| No. | Recording film |
|---|---|
| 1 | $Ge_{10}Sb_2Te_{13}$ |
| 2 | $Ge_4Sb_2Te_7$ |
| 3 | $Ge_8Sb_2Te_{13}Bi_2$ |
| 4 | $Ge_3Sb_2Te_7Bi$ |
| 5 | $Ge_6Sb_2Te_{13}Sn_4$ |
| 6 | $Ge_3Sb_2Te_7Sn$ |
| 7 | $Ge_{10}Bi_2Te_{13}$ |
| 8 | $Ge_{7.1}Bi_{4.3}Te_{13.6}$ |
| 9 | $Ge_{11.2}Bi_{1.1}Te_{12.8}$ |

As shown in Table 1, in Examples 1 to 7, the interface film uses a compound containing Hf, O and N and in which the O site of $HfO_2$ is replaced with N, the composition of the compound being represented by the formula $HfO_{2-x}N_x$. The results of analysis based on RBS, XPS and SIMS indicate that N replaces the O site of the compound containing Hf, O and N, used for the interface film. The composition ratio is as shown in Table 1. In Comparative Examples 1 to 6, the interface film uses a compound other than $HfO_{2-x}N_x$.

The sputtering apparatus used is a single-piece type sputtering apparatus in which various films are deposited in deferent deposition chambers, respectively. After each media is manufactured, the reflectance and transmittance thereof are measured with a spectrometer.

The recording films in the L0 and L1 layers are crystallized entirely with an initializing apparatus. After the initialization, the L0 and L1 layers are bonded together using a UV-curing resin so that the deposited surfaces are located inside and thus an interlayer separation layer 50 with a thickness of about 25 μm is formed.

A disc evaluation apparatus of DDU-1000 (manufactured by Pulstec Industrial Co., Ltd.) is used for evaluating the phase-change optical recording media. The apparatus comprises a blue-violet semiconductor laser with a wavelength of 405 nm and an objective lens with NA of 0.65. The recording experiment is carried out by land/groove recording.

TABLE 3

| Wavelength [nm] | 405 |
|---|---|
| NA | 0.65 |
| Track pitch [μm] (land/groove recording) | 0.34 |
| Linear velocity [m/sec] (1× speed)* | 5.4 |

*2× speed corresponds to 10.8 [m/sec]; 4× speed corresponds to 21.6 [m/sec].

The media is evaluated for the following items.

(1) Measurement of Bit Error Rate (SbER: Simulated Bit Error Rate)

The SbER measurement is for evaluating the media for data error rate. First, a mark train containing patterns of 2T to 13T at random is overwritten 10 times in a predetermined track. Then, the same random pattern is overwritten 10 times in the adjacent tracks on the both sides of the above track. Subsequently, SbER of the first track is measured.

(2) Analog Measurement

The analog measurement is for evaluating the media for read signal quality. First, a mark train containing patterns of 2T to 13T at random is overwritten 10 times. Then, a single pattern of 9T is overwritten once in that mark train. Thereafter, the carrier-to-noise ratio (referred to as CNR hereinafter) of the signal frequency of the 9T mark is measured with a spectrum analyzer. Next, the disk is irradiated with a laser beam at an erase power level during a single rotation to erase the recording mark. Thereafter, a decrease in the signal intensity of the 9T mark is measured. This is defined as an erase rate (ER). Then, a head is moved to a sufficiently distant track and measurement is made for cross-erase (E-X).

(3) Overwriting (OW) Test

Random signals are overwritten 2,000 times in the same track. Then, SbER is measured in the same manner as described above. At SbER of $1.5 \times 10^{-4}$ or more, it is difficult to correct errors. Whether the SbER exceeds the above value is determined after the overwriting operations are repeated 2,000 times, which is used as a criteria for evaluating the overwriting characteristics of the media.

In the evaluation, the optimum power for the SbER and CNR are evaluated as the sensitivity of the media. Here, in order to measure the transmittance of the L0 layer and the sensitivity of the L1 layer, two other media are provided; one of the media is manufactured by bonding the L0 layer in each example with a blank disk having no films deposited thereon, and the other media is manufactured by bonding the L1 layer in each example with a blank disk having no films deposited thereon. The evaluation is made at 1× speed, i.e., a linear velocity of 5.4 m/sec unless otherwise specified.

Table 4 shows all the results of the evaluations.

The evaluations of the media of Example 1 in which $HfO_{2-x}N_x$ (x=0.15) is used as an interface film are as follows. SbER is $1.8 \times 10^{-5}$ or less for both land and groove, and the OW times is 2,000 or more, which are practical characteristics. For analog data, CNR is 53.7 dB or more, the erase rate is −34.9 dB or less, and the cross-erase is −0.2 dB or less, for both land and groove, which are excellent results. Further, the sensitivity of the L1 layer and the transmittance of the L0 layer, these values being particularly important for dual-layer media, are 5.5 mW or less and 52.2%, respectively, which are good values. The L1 layer in the actual single-sided, dual-layer disk manufactured by bonding the L0 and L1 layers together has a sensitivity of 10.9 mW. Thus, substantially doubled LD power is required for the L1 layer in the actual single-sided, dual-layer media, since the L0 layer reduces the light intensity to about half. Therefore, it is necessary to increase the transmittance of the L0 layer and/or the sensitivity of the L1 layer. In a media in which faster recording is carried out, laser irradiation time becomes shorter and this necessarily requires increased LD power. Consequently, not only the L1 layer but also the L0 layer must have an increased sensitivity.

In the case of Example 2 in which $HfO_{2-x}N_x$ (x=0.04) is used as the interface film, SbER is $1.8 \times 10^{-5}$ or less for both land and groove, which is a practical error rate, and CNR is 53.9 dB or more for both land and groove, which is an excellent result.

In the case of Example 3 in which $HfO_{2-x}N_x$ (x=0.08) is used as the interface film, SbER is $2.2 \times 10^{-5}$ or less for both land and groove, which is a practical error rate, and CNR is 52.8 dB or more for both land and groove, which is an excellent result.

In the case of Example 4 in which $HfO_{2-x}N_x$ (x=0.1) is used as the interface film, SbER is $2.2 \times 10^{-5}$ or less for both land and groove, which is a practical error rate, and CNR is 53.2 dB or more for both land and groove, which is an excellent result.

In the case of Example 5 in which $HfO_{2-x}N_x$ (x=0.2) is used as the interface film, SbER is $2.1 \times 10^{-5}$ or less for both land and groove, which is a practical error rate, and CNR is 54.4 dB or more for both land and groove, which is an excellent result.

In the case of Example 6 in which $HfO_{2-x}N_x$ (x=0.23) is used as the interface film, SbER is $2.5 \times 10^{-5}$ or less for both land and groove, which is a practical error rate, and CNR is 54 dB or more for both land and groove, which is an excellent result.

In the case of Example 7 in which $HfO_{2-x}N_x$ (x=0.5) is used as the interface film, SbER is $2.4 \times 10^{-5}$ or less for both land and groove, which is a practical error rate, and CNR is 53.8 dB or more for both land and groove, which is an excellent result.

On the other hand, in Comparative Example 1 in which the interface film of $HfO_2$ is used, Comparative Example 2 in which the interface film of SiC is used, Comparative Example 3 in which no interface film is used, Comparative Example 4 in which the interface film of $Ta_2O_5$+SiC is used, Comparative Example 5 in which the interface film of GeN is used, and Comparative Example 6 in which the interface film of GeCrN is used, at least one of CNR, SbER, erase rate, sensitivity of L1 layer, and transmittance of L0 layer is insufficient. Thus, these media are not evaluated for OW characteristics.

TABLE 4

| | Interface film | CNR [dB] | SbER | Pw(L1) [mW] | T(L0) [%] | OW [cycles] | ER [dB] |
|---|---|---|---|---|---|---|---|
| Example 1 | $HfO_{2-x}N_x$ (x = 0.15) | 53.7 | $1.8 \times 10^{-5}$ | 5.5 | 52.2 | ≧2000 | 34.9 |
| Example 2 | $HfO_{2-x}N_x$ (x = 0.04) | 53.9 | $1.8 \times 10^{-5}$ | 6 | 51.5 | ≧2000 | 30.6 |

TABLE 4-continued

| | Interface film | CNR [dB] | SbER | Pw(L1) [mW] | T(L0) [%] | OW [cycles] | ER [dB] |
|---|---|---|---|---|---|---|---|
| Example 3 | $HfO_{2-x}N_x$ (x = 0.08) | 52.8 | $2.2 \times 10^{-5}$ | 5.6 | 52 | $\geqq 2000$ | 34.2 |
| Example 4 | $HfO_{2-x}N_x$ (x = 0.1) | 53.2 | $2.2 \times 10^{-5}$ | 5.8 | 51.5 | $\geqq 2000$ | 35 |
| Example 5 | $HfO_{2-x}N_x$ (x = 0.2) | 54.4 | $2.1 \times 10^{-5}$ | 5.6 | 51 | $\geqq 2000$ | 35 |
| Example 6 | $HfO_{2-x}N_x$ (x = 0.23) | 54 | $2.5 \times 10^{-5}$ | 5.7 | 51.6 | $\geqq 2000$ | 33.9 |
| Example 7 | $HfO_{2-x}N_x$ (x = 0.5) | 53.8 | $2.4 \times 10^{-5}$ | 5.7 | 50.5 | $\geqq 2000$ | 31.3 |
| Comparative Example 1 | $HfO_2$ | 51.1 | $3.1 \times 10^{-5}$ | 7.6 | 51 | — | 29 |
| Comparative Example 2 | SiC | 48.8 | $5.0 \times 10^{-4}$ | 8 | 42 | — | 25 |
| Comparative Example 3 | none | 50.9 | $3.3 \times 10^{-3}$ | 5.2 | 45 | — | 19 |
| Comparative Example 4 | $Ta_2O_5$ + SiC | 50.1 | $2.8 \times 10^{-4}$ | 6.2 | 46 | — | 28 |
| Comparative Example 5 | GeN | 49.9 | $3.9 \times 10^{-4}$ | 6.5 | 44 | — | 27 |
| Comparative Example 6 | GeCrN | 47.4 | $4.5 \times 10^{-4}$ | 6.6 | 45 | — | 25 |

Then, media of Examples 1 to 7 and Comparative Examples 1 and 4 using a GeSbTe-based recording film are evaluated at different linear velocities. Table 5 shows values of the erase rate. The results in Table 5 indicate that media using an interface film represented by the formula $HfO_{2-x}N_x$, in particular, those having a composition ratio x satisfying the condition of $0.1 \leqq x \leqq 0.2$, attain a very high erase rate even when an erase operation is carried out at a high linear velocity. Thus, these media exhibit more favorable results. On the other hand, the media of Comparative Examples 1 and 4 show a low erase rate even at 1× speed and a significantly low erase rate at 2× speed or more. Accordingly, these Comparative Examples are not practical.

TABLE 5

| | | ER[dB] | | | |
|---|---|---|---|---|---|
| | Interface film | 1× | 2× | 4× | Evaluation |
| Example 1 | $HfO_{2-x}N_x$ (x = 0.15) | 34.9 | 34.1 | 32 | Very good |
| Example 2 | $HfO_{2-x}N_x$ (x = 0.04) | 30.6 | 30.3 | 30.3 | Good |
| Example 3 | $HfO_{2-x}N_x$ (x = 0.08) | 34.2 | 30.2 | 30.3 | Good |
| Example 4 | $HfO_{2-x}N_x$ (x = 0.1) | 35 | 33.9 | 30.2 | Very good |
| Example 5 | $HfO_{2-x}N_x$ (x = 0.2) | 35 | 33.5 | 30.4 | Very good |
| Example 6 | $HfO_{2-x}N_x$ (x = 0.23) | 33.9 | 31.7 | 30.5 | Good |
| Example 7 | $HfO_{2-x}N_x$ (x = 0.5) | 31.3 | 30.8 | 30.1 | Good |
| Comparative Example 1 | $HfO_2$ | 29 | 21.2 | 10 | Bad |
| Comparative Example 4 | $Ta_2O_5$ + SiC | 28 | 22.6 | 11.3 | Bad |

Table 6 shows CNR and SbER for media using the interface film represented as $HfO_{2-x}N_x$ (x=0.15) as in the case of Example 1 as well as the recording film shown in Table 2.

Table 6 indicates that all the material systems have good results. This tendency also applies to the interface films of the other Examples.

TABLE 6

| No. | Recording film | CNR[dB] | SbER |
|---|---|---|---|
| 1 | $Ge_{10}Sb_2Te_{13}$ | 52.8 | $2.2 \times 10^{-5}$ |
| 2 | $Ge_4Sb_2Te_7$ | 53.2 | $2.2 \times 10^{-5}$ |
| 3 | $Ge_8Sb_2Te_{13}Bi_2$ | 53.7 | $1.8 \times 10^{-5}$ |
| 4 | $Ge_3Sb_2Te_7Bi$ | 54.4 | $2.1 \times 10^{-5}$ |
| 5 | $Ge_6Sb_2Te_{13}Sn_4$ | 53.2 | $1.9 \times 10^{-5}$ |
| 6 | $Ge_3Sb_2Te_7Sn$ | 53.8 | $2.4 \times 10^{-5}$ |

TABLE 6-continued

| No. | Recording film | CNR[dB] | SbER |
|---|---|---|---|
| 7 | $Ge_{10}Bi_2Te_{13}$ | 53.6 | $2.2 \times 10^{-5}$ |
| 8 | $Ge_{7.1}Bi_{4.3}Te_{13.6}$ | 52.1 | $2.4 \times 10^{-5}$ |
| 9 | $Ge_{11.2}Bi_{1.1}Te_{12.8}$ | 53.2 | $9.6 \times 10^{-6}$ |

Example 8

In the present example, a phase-change optical recording media having a REDML or TRC structure shown in FIG. 2 is manufactured. Polycarbonate (PC) substrates with a thickness of about 0.59 mm manufactured by injection molding are used. Each PC substrate has grooves formed at a pitch of 0.68 µm. This corresponds to a track pitch of 0.34 µm in land/groove (L/G) recording. In order to form the L0 layer closer to the light incident side, a ZnS:$SiO_2$ film, an interface film, a recording film, an interface film, a ZnS:$SiO_2$ film, an Ag alloy film, and a ZnS:$SiO_2$ film are deposited in this order on the surface of one PC substrate on which the grooves have been formed using a sputtering apparatus. In order to form the L1 layer remoter from the light incident side, an Ag alloy film, a three-layer film of the REDML structure, an interface film, a recording film, an interface film, and a ZnS:$SiO_2$ film are deposited in this order on the other PC substrate using a sputtering apparatus. The three-layer film of the REDML structure includes a stack of a ZnS:$SiO_2$ film, a film having a similar composition to that of the interface film, and a ZnS:$SiO_2$ film. The recording film uses a GeSbTeBi-based material.

The interface film used has a composition $HfO_{2-x}N_x$ (x=0.15). A mixed target of ZnS and $SiO_2$ is used to deposit ZnS:$SiO_2$ film. The sputtering apparatus used is a single-piece type sputtering apparatus as described above.

The evaluations of the media are as follows. SbER is $1.9 \times 10^{-5}$ or less for both land and groove, which is a practical error rate. For analog data, CNR is 53.7 dB or more for both land and groove. Further, the sensitivity of the L1 layer can be significantly increased to 4.5 mW, which is a particularly excellent result. It has been confirmed from an evaluation for the dependence of CNR on power that an amorphous mark starts to be formed in the recording film at a very low power. The sensitivity can be further improved by increasing the total number of films in the REDML structure to four or five.

With phase-change optical recording media of the embodiments according to the present invention, the thickness of the substrate and the order of deposition are not limited. Accordingly, a media that light is incident on a substrate having films deposited thereon or a media that light is incident on a transparent sheet bonded to a multilayer film deposited on a substrate may be used. For example, the present invention is also effective for a media having a thin transparent sheet with a thickness of about 0.1 mm formed on the light incident side to which light is applied through an objective with a high NA of about 0.85.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A phase-change optical recording medium comprising:
a recording film that causes reversible phase-change between a crystalline phase and an amorphous phase on irradiation with light; and
an interface film formed in contact with at least one surface of the recording film and having a composition represented by the following formula:

$HfO_{2-x}N_x$, where $0<x\leq0.5$.

2. The phase-change optical recording medium according to claim 1, wherein the interface film has a composition represented by the following formula:

$HfO_{2-x}N_x$, where $0.1\leq x\leq0.2$.

3. The phase-change optical recording medium according to claim 1, wherein the interface film has an optical extinction coefficient of $1\times10^{-2}$ or less.

4. The phase-change optical recording medium according to claim 1, wherein the recording film is represented by the following formula:

$Ge_xSb_yTe_z$, where $x+y+z=100$, and has a composition within a range defined by $x=55$, $z=45$; $x=45$, $z=55$; $x=10$, $y=28$, $z=42$; and $x=10$, $y=36$, $z=54$ on a ternary phase diagram of GeSbTe.

5. The phase-change optical recording medium according to claim 4, wherein a part of constituent elements of the recording film is replaced with Bi and/or Sn, and the recording film has a composition represented by the following formula:

$(Ge_wSb_{(1-w)})_x(Sb_vBi_{(1-v)})_yTe_z$, where $x+y+z=100$, $0\leq w<0.5$ and $0\leq v<0.7$.

6. The phase-change optical recording medium according to claim 1, wherein the recording film is represented by the following formula:

$Ge_xBi_yTe_z$, where $x+y+z=100$, and has a composition within a range defined by $x=55$, $z=45$; $x=45$, $z=55$; $x=10$, $y=28$, $z=42$; and $x=10$, $y=36$, $z=54$ on a ternary phase diagram of GeBiTe.

7. A phase-change optical recording medium comprising:
a recording film that causes reversible phase-change between a crystalline phase and an amorphous phase on irradiation with light;
an interface film formed in contact with at least one surface of the recording film and having a composition represented by the following formula:

$HfO_{2-x}N_x$, where $0<x\leq0.5$;
a reflective film formed remoter from a light incident side than the recording film or the interface film; and
a multilayer film formed between the recording film or interface film and the reflective film and comprising at least three layers of different types of materials with a substantially equivalent refractive index, at least one of the layers comprising Hf (hafnium), O (oxygen) and N (nitrogen).

8. The phase-change optical recording medium according to claim 7, wherein the interface film has a composition represented by the following formula:

$HfO_{2-x}N_x$, where $0.1\leq x\leq0.2$.

9. The phase-change optical recording medium according to claim 7, wherein the interface film has an optical extinction coefficient of $1\times10^{-2}$ or less.

10. The phase-change optical recording medium according to claim 7, wherein the recording film is represented by the following formula:

$Ge_xSb_yTe_z$, where $x+y+z=100$, and has a composition within a range defined by $x=55$, $z=45$; $x=45$, $z=55$; $x=10$, $y=28$, $z=42$; and $x=10$, $y=36$, $z=54$ on a ternary phase diagram of GeSbTe.

11. The phase-change optical recording medium according to claim 10, wherein a part of constituent elements of the recording film is replaced with Bi and/or Sn, and the recording film has a composition represented by the following formula:

$(Ge_wSb_{(1-w)})_x(Sb_vBi_{(1-v)})_yTe_z$, where $x+y+z=100$, $0\leq w<0.5$ and $0\leq v<0.7$.

12. The phase-change optical recording medium according to claim 7, wherein the recording film is represented by the following formula:

$Ge_xBi_yTe_z$, where $x+y+z=100$, and has a composition within a range defined by $x=55$, $z=45$; $x=45$, $z=55$; $x=10$, $y=28$, $z=42$; and $x=10$, $y=36$, $z=54$ on a ternary phase diagram of GeBiTe.

13. The phase-change optical recording medium according to claim 7, wherein the multilayer film is a stack of a ZnS:SiO2 film, a film having a composition represented by the formula $HfO_{2-x}N_x$, where $0<x\leq0.5$, and a ZnS:SiO2 film.

* * * * *